United States Patent
Zhong

(10) Patent No.: US 8,891,607 B2
(45) Date of Patent: Nov. 18, 2014

(54) FEED FORWARD EQUALIZER TAP WEIGHT ADAPTATION BASED ON CHANNEL ESTIMATION

(75) Inventor: Lizhi Zhong, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 169 days.

(21) Appl. No.: 13/604,812

(22) Filed: Sep. 6, 2012

(65) Prior Publication Data

US 2014/0064352 A1   Mar. 6, 2014

(51) Int. Cl.
*H03H 7/30*   (2006.01)
*H04L 25/03*   (2006.01)

(52) U.S. Cl.
CPC .............................. *H04L 25/03057* (2013.01)
USPC ........... 375/233; 375/229; 375/230; 375/232; 375/350

(58) Field of Classification Search
CPC ................... H04L 25/03038; H04L 25/03057; H04L 25/03076; H04L 2025/0349
USPC .......................... 375/229, 230, 232, 233, 350
See application file for complete search history.

(56) References Cited

U.S. PATENT DOCUMENTS

| | | | |
|---|---|---|---|
| 5,327,460 A | 7/1994 | Batruni | 375/14 |
| 5,345,476 A | 9/1994 | Tsujimoto | 375/14 |
| 5,367,540 A | 11/1994 | Kakuishi et al. | 375/103 |
| 5,414,733 A | 5/1995 | Turner | 375/233 |
| 5,513,216 A | 4/1996 | Gadot et al. | 375/233 |
| 5,561,687 A | 10/1996 | Turner | 375/233 |
| 5,604,769 A | 2/1997 | Wang | 375/229 |
| 5,617,450 A | 4/1997 | Kakuishi et al. | 375/230 |
| 5,748,674 A | 5/1998 | Lim | 375/233 |
| 5,793,801 A | 8/1998 | Fertner | 375/219 |
| 6,055,269 A | 4/2000 | Drost et al. | 375/232 |
| 6,115,418 A | 9/2000 | Raghavan | 375/233 |
| 6,144,697 A | 11/2000 | Gelfand et al. | 375/233 |
| 6,178,198 B1 | 1/2001 | Samueli et al. | 375/214 |
| 6,252,904 B1 | 6/2001 | Agazzi et al. | 375/233 |
| 6,400,761 B1 | 6/2002 | Smee et al. | 375/232 |
| 6,459,730 B1 | 10/2002 | Samueli et al. | 375/233 |
| 6,775,529 B1 | 8/2004 | Roo | 455/296 |
| 6,870,881 B1 | 3/2005 | He | 375/233 |
| 7,167,516 B1 | 1/2007 | He | 375/232 |
| 7,257,181 B2 | 8/2007 | Jones et al. | 375/350 |
| 7,313,182 B2 * | 12/2007 | Fimoff et al. | 375/233 |
| 7,349,470 B2 * | 3/2008 | Hillery | 375/233 |
| 7,764,732 B2 * | 7/2010 | Rollins et al. | 375/233 |
| 8,031,765 B1 | 10/2011 | He | 375/233 |
| 8,743,943 B2 * | 6/2014 | Shumarayev et al. | 375/233 |
| 2009/0268802 A1 * | 10/2009 | Wang | 375/233 |
| 2010/0020860 A1 | 1/2010 | Dai et al. | 375/231 |
| 2010/0177816 A1 | 7/2010 | Malipatil et al. | 375/233 |
| 2010/0284686 A1 * | 11/2010 | Zhong | 398/1 |

\* cited by examiner

*Primary Examiner* — Leon Flores
(74) *Attorney, Agent, or Firm* — Christopher P Maiorana, PC

(57) ABSTRACT

An apparatus including a receiver having a feed forward equalizer (FFE) coupled to a communication channel. The receiver may be configured to adjust the FFE using information based on an estimate of one or more characteristics of the communication channel.

20 Claims, 9 Drawing Sheets

FEED FORWARD EQUALIZER TAP WEIGHT ADAPTATION BASED ON CHANNEL ESTIMATION

FIELD OF THE INVENTION

The present invention relates to communications generally and, more particularly, to a method and/or apparatus for implementing feed forward equalizer (FFE) tap weight adaptation based on channel estimation.

BACKGROUND OF THE INVENTION

An analog delay line or digital feed forward equalizer (FFE) may be used alone or together with a decision feedback equalizer (DFE) in a communication system. The adaptation of the tap weights of the two equalizers is important. Although the optimal tap weights have well been studied in the literature, practical adaptation algorithms achieving desired performance with low implementation cost still invites innovations. For example, many text books assume the input signal to the FFE is available to the adaptation algorithm. While this is true if an analog-to-digital converter (ADC) is available, it is not the case for the analog delay line. In the case of an analog delay line, a new way of estimating the channel is needed.

In conventional approaches, the analog delay line or the FFE are used only to remove the precursor inter symbol interference (ISI), while the DFE is used to handle post cursor ISI. Optimal tap weights have been derived based on the above assumptions. In practical implementations, however, the analog delay line or FFE may be used to reduce post cursor ISI as well. The joint optimization between the analog delay line or FFE and the DFE becomes an interesting problem.

It would be desirable to implement a method and/or apparatus for implementing feed forward equalizer (FFE) tap weight adaptation based on channel estimation.

SUMMARY OF THE INVENTION

The present invention concerns an apparatus including a receiver having a feed forward equalizer (FFE) coupled to a communication channel. The receiver may be configured to adjust the FFE using information based on an estimate of one or more characteristics of the communication channel.

The objects, features and advantages of the present invention include providing a method and/or apparatus for implementing feed forward equalizer (FFE) tap weight adaptation based on channel estimation that may (i) adapt the FFE tap weights without having access to the digital samples of the input signal of the FFE, (ii) enable joint optimization between the FFE and a decision feedback equalizer (DFE), (iii) allow the FFE to remove precursor ISI or work together with the DFE to reduce post cursor ISI, and/or (vi) adapt the FFE based on channel estimation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
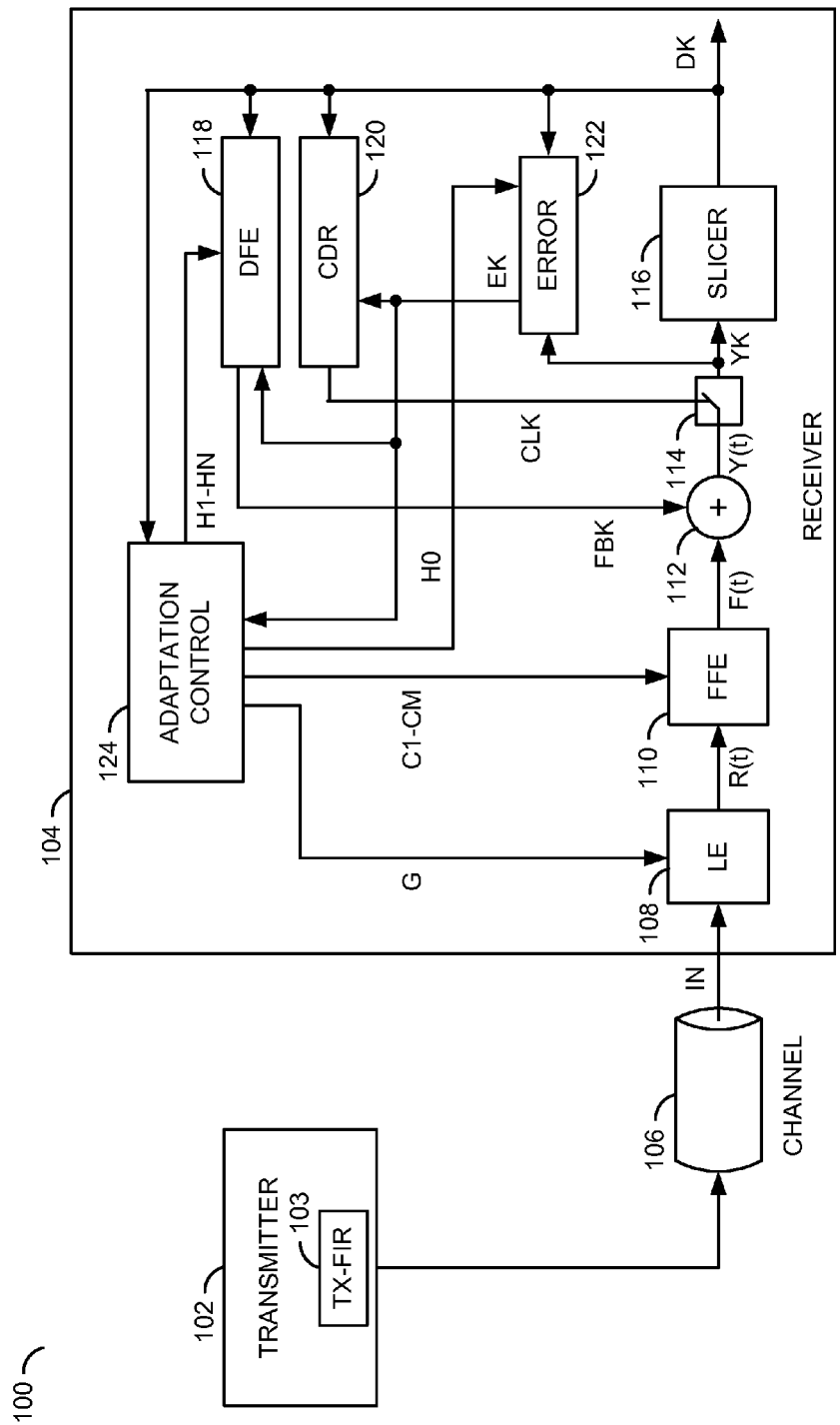
FIG. 1 is a block diagram illustrating a communication system in accordance with an embodiment of the present invention.

Referring to FIG. 1, a block diagram is shown illustrating a communication channel 100 in accordance with an example embodiment of the present invention. The communication channel 100 may comprises a transmitter 102, a receiver 104 and a channel medium 106. The transmitter 102 and the receiver 104 may be implemented, in one example, on different chips. In one example, the transmitter 102 may include a transmitter finite impulse response (Tx-FIR) filter 103. In one example, the channel medium 106 may be implemented as a circuit board, an optical fiber, a wireless medium, a trace, a cable, air and/or free space.

The receiver 104 may comprise a module 108, a module 110, a module 112, a module 114, a module 116, a module 118, a module 120, a module 122, and a module 124. The modules 108 to 124 may represent circuits and/or blocks that may be implemented as hardware, software, a combination of hardware and software, or other implementations. The module 108 may be implemented as a linear equalizer (LE). The module 108 is optional and may be omitted. The module 110 may be implemented as a delay line or feed forward equalizer (FFE). The module 112 may be implemented as an adder. The module 114 may be implemented, in one example, as a analog to digital converter. The module 116 may be implemented as a detector. In one example, the module 116 may be implemented as a slicer. However, other types of detectors (e.g., symbol detector, bit slicer, etc.) may be implemented accordingly to meet the design criteria of a particular implementation. The module 118 may be implemented as an adaptive decision feedback equalizer (DFE). The module 120 may be implemented as a baud-rate clock and data recovery (CDR) module. The module 122 may be implemented as an error signal generation module. The module 124 may be implemented as an adaptation control logic.

The module 108 may have a first input that may receive a signal (e.g., IN) from the channel medium 106 and a second input that may receive a signal (e.g., G) from the module 124. In one example, the signal IN may be converted from an optical signal to an electrical signal prior to presentation to the input of the module 108. The signal G may, in one example, control a gain and/or poles of the module 108. The module 110 may have a first input that may receive a signal (e.g., R(t)) from an output of the module 108 and a second input that may receive a signal comprising a number of tap weights (e.g., C1-CM). When the module 108 is omitted, the module 110 may receive the signal IN directly.

An output of the module 110 may present a signal (e.g., F(t)) to a first input of the module 112. The signal F(t) may comprise an equalized version of the received signal R(t) with precursor cancellation. An output of the module 112 may present a signal (e.g., Y(t)) to a first input of the module 114. The signal Y(t) may comprise a sum of the equalized signal F(t) and a feedback signal (e.g., FBK) received by the module 112 from an output of the module 118. An output of the module 114 may present samples (e.g., YK) of the signal Y(t) to an input of the module 116 and a first input of the module 122. The module 114 may sample the signal Y(t) in response to a signal (e.g., CLK) received by the module 114 from an output of the module 120. An output of the module 116 may present a data output signal (e.g., DK).

The signal DK may be presented to a first input of the module 118, a first input of the module 120, a second input of the module 122 and a first input of the module 124. An output of the module 122 may present a signal (e.g., EK) to a second input of the module 118, a second input of the module 120 and a second input of the module 124. The signal EK may be generated in response to the signal YK, the signal DK, and a signal (e.g., H0) received by the module 122 from a first output of the module 124. A second output of the module 124 may present a signal comprising a number of tap weights (e.g., H1-HN) to a third input of the module 118. A third output of the module 124 may present the signal comprising the number of tap weight C1-CM to the second input of the module 110. A fourth output of the module 124 may present the signal G to the second input of the module 108.

The signal EK may comprise an error signal. The signal H0 may comprise a target signal amplitude. The target signal amplitude H0 generally represents a desired signal amplitude (e.g., EK=H0*DK−RK). After error is minimized, RK is generally close to the desired signal: H0*DK. The module 124 may be configured to generate one or more control signals that my be used to control activation and scheduling of equalizer adaptation loops of the module 108, the module 110, and the module 118.

The equalizer adaptation loops of the module 110 and the module 118 may be implemented using conventional techniques modified to allow control in accordance with the present invention. In one example, the module 118 may be implemented as a fixed tap (e.g., 8-10 taps) DFE. In another example, the module 118 may be implemented as a floating tap DFE. For example, the module 118 may be implemented in accordance with commonly-owned co-pending application U.S. Ser. No. 11/777,337, filed Jul. 13, 2007, which is herein incorporated by reference in its entirety. The floating tap DFE generally provides effective cancellation of reflections in the channel medium 106.

In general, the signal YK may be expressed using the following equation:

$$YK = \text{Sum}(C(i)*RK(i)) - \text{Sum}(H(j)*DK(j)), \quad \text{EQ. 1}$$

where i represents a range of FFE tap indexes and j represents a range of DFE tap indexes. To minimize the mean squared error, a gradient of the value of C may be used. The gradient of the value of C may be represented by the following equation:

$$\text{delta } C(i) = EK*RK(i), \quad \text{EQ. 2}$$

where EK is defined as YK−H0*DK. The sign-sign version of the gradient may be expressed as follows:

$$\text{sign}(EK)*\text{sign}(RK(i)). \quad \text{EQ. 3}$$

When RK(i) is not available, such as in the case of an analog delay line, a solution to the problem is more difficult. Approximating RK with DK is generally not good since RK is before the FFE module 110 and the DFE module 118 and, therefore, may contain a lot of ISI not yet removed by either one of the FFE module 110 and the DFE module 118. As a result, the sign of RK may be very different from the sign of YK, which is the same as DK. In general, RK may be represented as the convolution of the transmitter finite impulse response filter (TX-FIR) 103, the channel medium 106, the LE module 108 (if present), and the transmitted data bits. Consequently, the expression for the gradient for C(i) becomes:

$$\text{sign}(EK)*\text{sign}(\text{sum of } f_n*DK(n+i)), \quad \text{EQ. 4}$$

where n is any integer and fn represents the pulse response of the combined TX-FIR, channel medium, and LE. The above technique allows the adaptation to be much faster and enables joint optimization of the FFE module 110 and the DFE module 118.

The channel pulse response fn may be estimated using DFE tap weights, but the FFE module 110 has to be turned off to avoid interference to the DFE module 118. Once the channel pulse response fn is estimated, the estimate may be used by the FFE module 110 as in the above gradient. The DFE adaptation may be reset to allow the DFE module 118 to adapt at the same time (using the same loop filter bandwidth) as the FFE module 110 to achieve a joint optimum solution. For example, the signal comprising the tap weights C1-CM presented by the module 124 to the module 110 may be generated based upon the estimate of the channel pulse response. In one example, the signal may be expressed using the following equation:

$$\Delta C(l,K) = \text{sign}(EK)*\text{sign}(\Sigma(H(i)DK-l-i), i=0,1,\ldots,n), \quad \text{EQ. 5}$$

where l represents the FFE tap index and n represents the number of DFE tap positions.

The signal presented by the module 124 to the module 110 may be implemented in a variety of ways. The expression Hi*Dk−i may be used to generally represent the taps of the DFE module 118, where i represents the tap position. For example, the first tap of the DFE module 118 may be expressed as H1*DK−1. The tap position of the first tap is 1 and H1 is the tap weight of the tap at tap position 1. The tap weight H1 may have a value (e.g., h1). For h1=20 mV, 20 mV is the tap weight value of the tap at tap position 1. If 20 mV corresponds to a code, for example, of 5 in a particular implementation, 5 is the code of the tap weight of the tap at tap position 1. In one example, the signal presented by the module 124 to the module 110 may comprise tap weight values. In another example, the signal presented by the module 124 to the module 110 may comprise codes of the tap weights (e.g., codes corresponding to the tap weight values).

Figure 2:
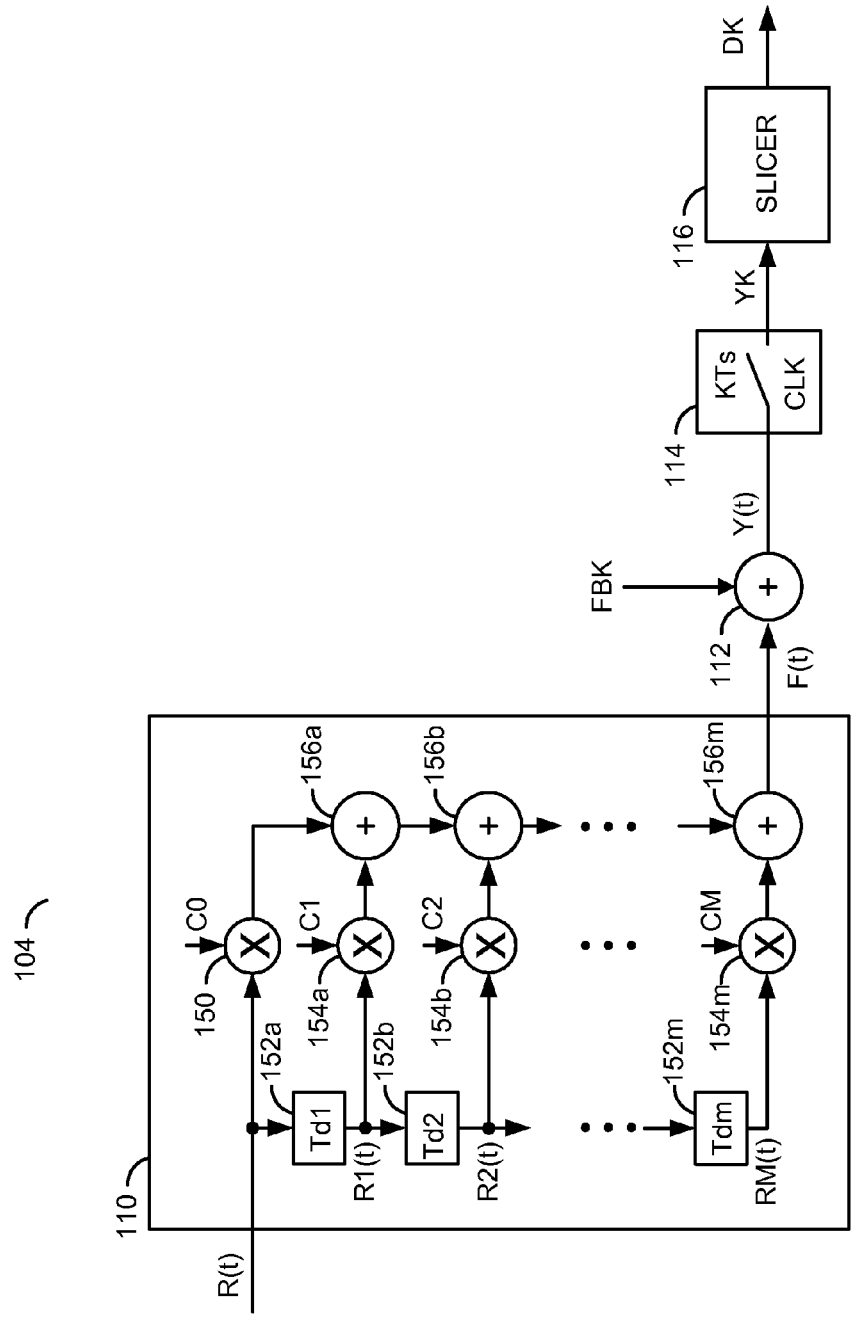
FIG. 2 is a diagram illustrating an example implementation of a feed forward equalizer (FFE) in accordance with an example embodiment of the present invention.

Referring to FIG. 2, a block diagram is shown illustrating an example implementation of a feed forward equalizer (FFE) in accordance with an embodiment of the present invention. In one example, the module 110 may implement an analog delay line configured to generate a plurality of weighted signals that may be fed forward and summed. The module 110 may receive the signal R(t) at the first input and present the signal F(t) at the output. In one example, the module 110 may comprise a multiplier 150 configured to generate a weighted version of the signal R(t) and plurality of delay elements 152a-152m configured to generate a plurality of delayed versions (e.g., R1(t), R2(t), ..., RM(t)) of the signal R(t). The weighted version of the signal R(t) may be generated by the multiplier 150 and a respective tap weight (e.g., C0).

In one example, each of the delay elements 152a-152m may be configured to provide a delay (e.g., Td1, Td2, Tdm)

equal to the sampling period Ts. However, the delays Td1, Td2, Tdm may vary from the sampling period Ts and/or each other to meet the design criteria of a particular implementation. The signals R1(*t*), R2(*t*), ..., RM(t) may be weighted and added to the weighted version of the received signal R(t). In one example, the weighting may be accomplished using a plurality of multipliers 154*a*-154*m* and respective tap weights (e.g., C1, C2, ..., CM). The weighted signals and the weighted version of the received signal R(t) may be added using a plurality of adders 156-156*m*. For example, if the module 110 is implemented as a three-tap FFE, the signal F(t) would comprise C0*R(t)+C1*R(t−Td1) C2*R(t−Td1−Td2). The modules 150-156*m* may represent circuits and/or blocks that may be implemented as hardware, software, a combination of hardware and software, or other implementations.

In one example, the delay elements 152*a*-152*m* may be implemented with analog devices. For example, inductors may be used to implement the delay elements 152*a*-152*m*. The use of inductors to provide the delay may become more attractive as the data rate increases, since the size of the inductors may be reduced. Alternative ways to implement analog delay elements 152*a*-152*m* may include, but are not limited to the use of active devices and/or transmission lines. Since many taps may be implemented, the module 110 may provide an equalizer that has more degrees of freedom. More degrees of freedom may allow the module 110 to equalize not only smooth channels, but also channels with reflections within the range covered by the delay elements 152*a*-152*m*.

In an alternative embodiment, each of the modules 152*a*-152*m* may be implemented as a register. The modules 152*a*-152*m* may be connected sequentially such that consecutive delayed samples (e.g., RK1 to RKm) may be shifted through the plurality of modules 152*a*-152*m* from the module 152*a* to the module 152*m*. The signal R(t) may be transferred to the circuit 152*a*. Each circuit 152*a*-152*m* may generate a corresponding output signal (e.g., RK1 to RKm) that may be transferred to the modules 154*a*-154*m*.

Each of the modules 154*a*-154*m* may implement a multiplication circuit. The modules 154*a*-154*m* are generally operational to multiply the respective delayed input signals, received from the modules 152*a*-152*m*, by respective tap weights (e.g., C1-CM). Each product calculated by the modules 154*a*-154*m* may be presented to the modules 156*a*-156*m*. The modules 156*a*-156*m* may add the product values. Other embodiments of the circuit 110 may be implemented to meet the criteria of a particular application.

Figure 3:
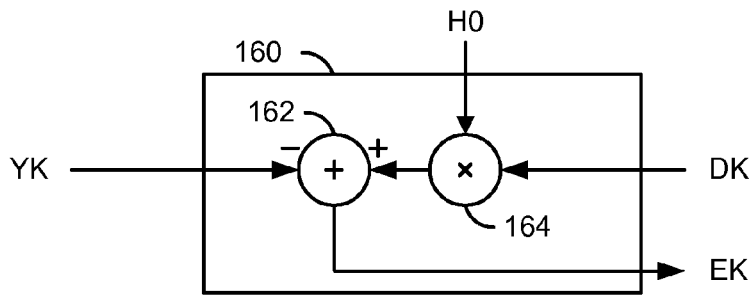
FIGS. 3-5 are diagrams illustrating alternative methods of generating an error signal of FIG. 1.
Figure 4:
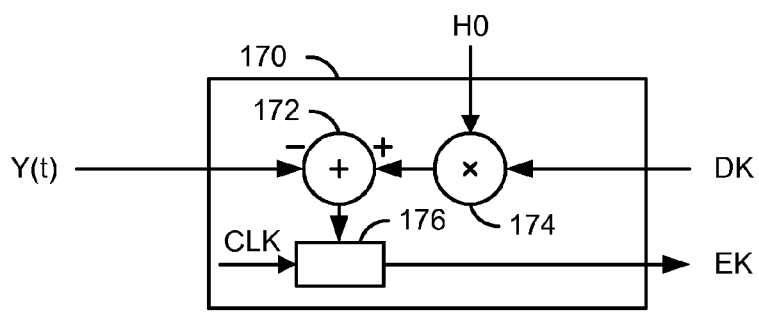
Figure 5:
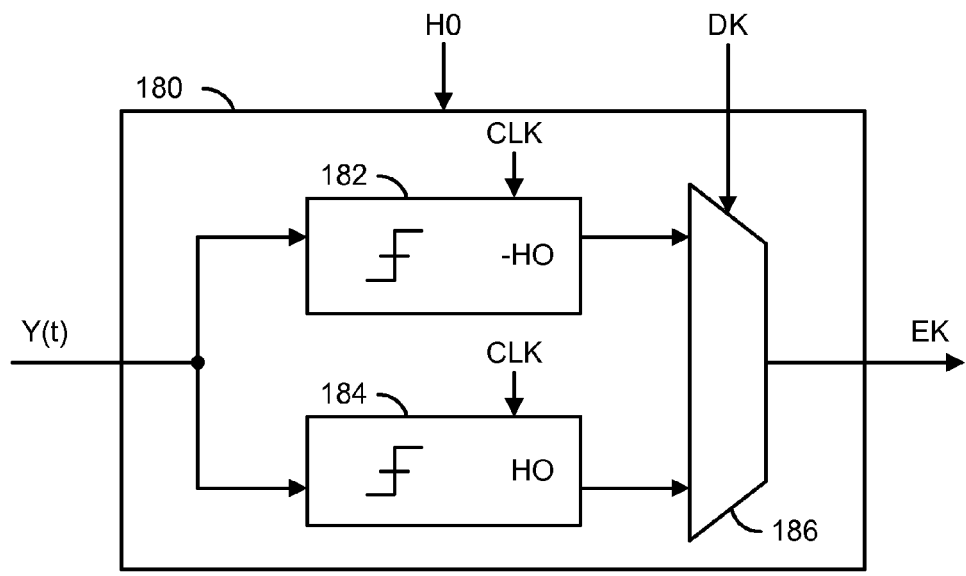

Referring to FIGS. 3-5, diagrams of a module 160 (FIG. 3), a module 170 (FIG. 4), and a module 180 (FIG. 5) are shown illustrating alternative error signal generation modules in accordance with embodiments of the present invention. Referring to FIG. 3, the module 160 may be implemented to generate the signal EK based upon the signal YK and the signal DK. The module 160 may comprise a module 162 and a module 164. The module 162 may implement an adder. The module 164 may implement a multiplier. An output of the module 162 may present the signal EK. A first input of the module 162 may receive the signal YK. A second input of the module 162 may receive a signal presented at an output of the module 164. The module 162 may be configured to subtract the signal received at the first input from the signal received at the second input. A first input of the module 164 may receive the signal DK and a second input of the module 164 may receive the signal H0. The signal presented at the output of the module 164 may comprise a product of the signal DK and the signal H0 (e.g., H0*DK). Thus, the signal EK may be represented by the following Equation 6:

$$EK=H0*DK-YK. \qquad \text{EQ. 6}$$

Referring to FIG. 4, the module 170 may be implemented to generate the signal EK based upon the signal Y(t) and the signal DR. The module 170 may comprise a module 172, a module 174, and a module 176. The module 172 may implement an adder. The module 174 may implement a multiplier. The module 176 may implement a capture latch (or register). A first input of the module 172 may receive the signal Y(t). A second input of the module 172 may receive a signal presented at an output of the module 174. The module 172 may be configured to subtract the signal received at the first input from the signal received at the second input. A first input of the module 174 may receive the signal DK and a second input of the module 174 may receive the signal H0. The signal presented at the output of the module 174 may comprise a product of the signal DK and the signal H0. An output of the module 172 may be presented to an input of the module 176. The signal presented at the output of the module 172 may comprise the difference of the signal Y(t) and the product of the signal DK and the signal H0. The module 176 may be configured to latch the signal received from the module 172 in response to the signal CLK. An output of the module 176 may present the signal EK. Thus, the signal EK may be represented by the following Equation 7:

$$EK(i)=H0*DK(i)-Y(t). \qquad \text{EQ. 7}$$

Referring to FIG. 5, the module 180 may be implemented to generate the signal EK based upon the signal Y(t) and the signal DK. The module 180 may have a first input that may receive the signal Y(t), a second input that may receive the signal DK, a third input that may receive a signal H0, and an output that may present the signal EK. In one example, the signal H0 may be used to set a threshold of the module 180. For example, the module 180 may comprise a block (or circuit) 182, a block (or circuit) 184, and a block (or circuit) 186. The block 182 may be implemented as a capture latch. The block 184 may be implemented as a capture latch. The block 186 may be implemented as a multiplexer. The blocks 182 and 184 may have latch thresholds of −H0 and H0, respectively, where H0 represents the target level of the receiver circuit containing the module 180.

The signal Y(t) may be presented to a first input of the block 182 and a first input of the block 184. A second input of the block 182 and a second input of the block 184 may receive the signal CLK. An output of the block 182 may be presented to a first input of the block 186. An output of the block 184 may be presented to a second input of the block 186. The signal DK may be presented to a control input of the block 186. The signal EK is generally presented at an output of the block 186.

Figure 6:
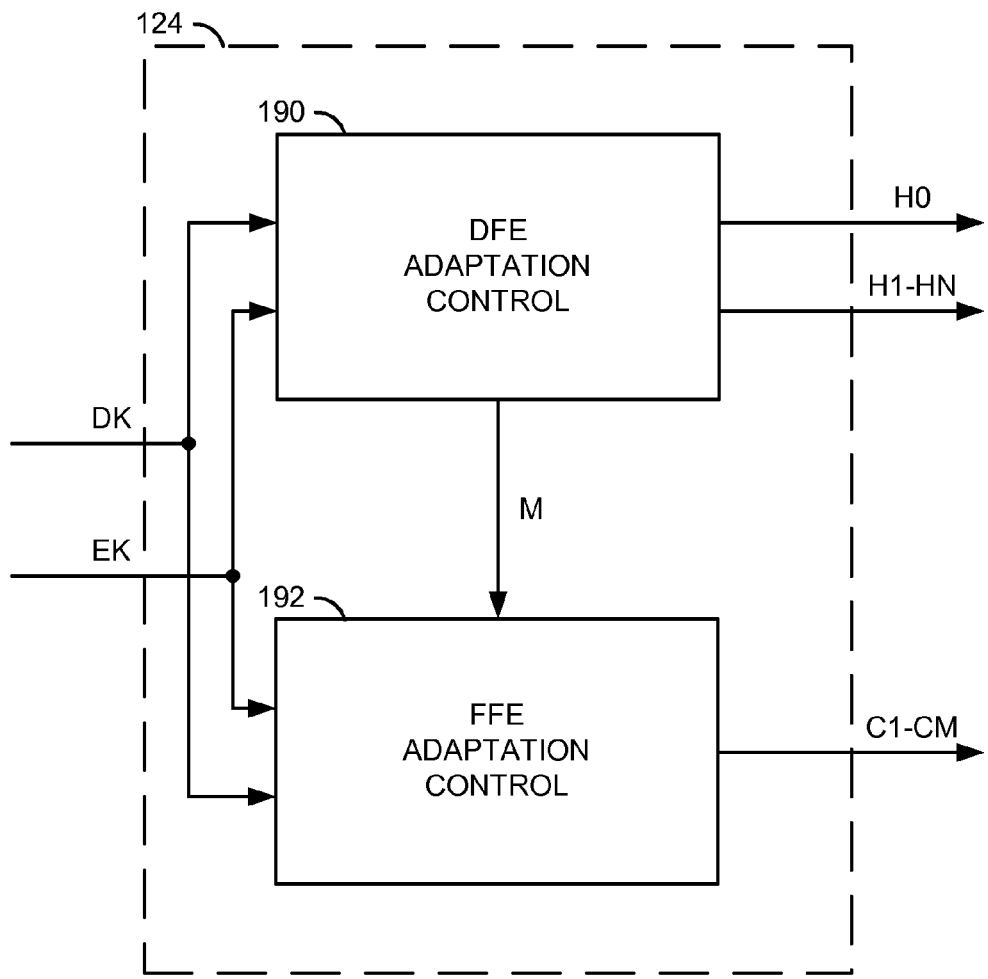
FIG. 6 is a diagram illustrating sub-modules of an adaptation control logic in accordance with an embodiment of the present invention.

Referring to FIG. 6, a diagram is shown illustrating example sub-modules of the adaptation control logic 124 of FIG. 2 in accordance with an embodiment of the present invention. In one example, the adaptation control logic 124 may comprise a module 190 and a module 192. The module 190 may implement DFE adaptation control logic (or loops). The module 192 may implement FFE adaptation control logic (or loops). The module 190 may receive the signals DK and EK and generate a signal (e.g., M). The signal M generally represents an estimate of a channel pulse response of the system 100. The module 192 may receive the signals DK and EK and the estimate M and generate the signal comprising the tap weights C1-CM.

Adaptation of the module 110 is generally based on the gradients of the tap weight coefficients. For example, tap weight coefficient C1 may be adapted using the gradient expressed in the following equation 8:

$$\text{gradient } C1 = \text{sign}(EK) \times \text{sign}(H0*D(K-1) + H1 \times D(K-1-1) + \ldots H4 \times D(K-4-1)) \qquad \text{EQ.8}$$

In equation 8, the actual voltage of the DFE tap weight may be utilized. However, the voltage levels may be obtained based on the following equation 9:

$$Hi = (\text{code of } Hi) \times (\text{step size}), \text{ for } i = 0\text{-}4 \qquad \text{EQ.9}$$

The "code of Hi" may be a predetermined voltage (or constant value). When all of the DFE tap weights have the same step size, the DFE tap weights may be replaced by corresponding digital codes without causing a sign change. Similarly, if a given step size is different from another step size by an integer amount, the given step size may also be left out of the equations. For example, if the step size of the coefficients H0 and H1 is twice that of the rest of the taps, the other tap weights may be replaced with the corresponding codes, H0 may be replaced with a 2×H0 code and H1 may be replaced with a 2×H1 code. When the step size is arbitrary, the coding scheme for the coefficients may minimize the number of bits used to represent the coefficients. An approximation for each coefficient may also be made by rounding up the code to the nearest integer to reduce the number of bits of an adder.

The error signal EK may be obtained by (i) comparing the corrected signal Y(t) with a target level H0*DK in the circuit 122 or (ii) by using a crossing sampling in the circuit 180. The error signal EK obtained by comparing generally leads to a center equalized tap weight for the module 110. The error signal EK obtained using the crossing sampling may cause the tap weight of the module 110 to converge on a setting that minimizes jitter.

The FFE adaptation may utilize the following theorem. If the input to a system is XK and a sampling rate is 1/T, the sampled output WK may be a convolution of XK and the sampled pulse response of the system PK (e.g., WK= XK⊗PK), where PK is obtained by sampling the pulse response at the rate of 1/T. The input may be expressed as $$\sum_{i=-\infty}^{\infty} Xi \times G(t - i \times T),$$

where G(t) is 1 for 0≤t≤T and 0 otherwise. For each pulse G(t) at the input to the system, the corresponding output W(t) may be the pulse response of the system p(t). Consequently, the output may be expressed by equation 10 as follows:

$$W(t) = \sum_{i=-\infty}^{\infty} Xi \times p(t - i \times T) \qquad \text{EQ. 10}$$

Sampling at the rate of 1/T, the sampled output may be expressed by equation 11 as follows:

$$\begin{aligned} WK &= W(K \times T) \\ &= \sum_{i=-\infty}^{\infty} Xi \times p(K \times T - i \times T) \\ &= \sum_{i=-\infty}^{\infty} Xi \times P(K - i) \\ &= XK \otimes PK \end{aligned} \qquad \text{EQ. 11}$$

To find a technique to adapt the tap weights of the module 110, a model is generally used, for example, as shown in FIG. 1. The model generally includes the functional blocks corresponding to the channel adaptation. Going by the model and equation 10, the input to the slicer may be expressed by equation 12 as follows:

$$YK = \sum_{n=-\infty}^{\infty} Fn \times \left( \sum_{l=L1}^{L2} Cl \times D(K - n - l) \right) - \sum_{i=1}^{M} Hi \times D(K - i) \qquad \text{EQ. 12}$$

Where (i) Fn may be the combined pulse response of the transmitter filter TX-FIR 103, the channel medium 106 and the module 108 (if present), (ii) Cl is a tap weight of the circuit 110 and (iii) the parameters L1 and L2 are the lower and upper bounds of the tap positions. In some embodiments, L1=−2 and L2=1. Other values of the parameters L1 and L2 may be implemented to meet the criteria of a particular application.

The error values in the signal EK are generally the same as that of the DFE loop per equation 13 as follows:

$$EK = YK - H0 \times DK \qquad \text{EQ.13}$$

By differentiating the mean squared error in regard to Cl, a corresponding least mean square (e.g., LMS) gradient for tap 1 may be expressed by equation 14 as follows:

$$LMS \text{ gradient} = \text{sign}(EK) \times \text{sign}\left( \sum_{n=-\infty}^{\infty} Fn \times D(K - n - l) \right) \qquad \text{EQ. 14}$$

In some embodiments, the parameter l may be (i) 1 for the first post-cursor tap, (ii) −1 for the first precursor tap and (iii) −2 for the second precursor tap. Other values may be implemented to meet the criteria of a particular application. Assuming error-free operation, the least mean square gradient used at the receiver may be expressed by equation 15 as follows:

$$LMS \text{ gradient} = \text{sign}(EK) \times \text{sign}\left( \sum_{n=-\infty}^{\infty} Fn \times D(K - n - l) \right) \qquad \text{EQ. 15}$$

Due to implementation constraints, only a finite number of decisions are generally used. Thus, equation 15 may be approximated by equation 16 as follows:

$$LMS \text{ gradient} = \text{sign}(EK) \times \text{sign}\left( \sum_{n=N1}^{N2} Fn \times D(K - n - l) \right) \qquad \text{EQ. 16}$$

Where N1 may be a predetermined lower value and N2 a predetermined upper value. In some embodiments, N1=−1 and N2=4. Other values may be implemented to meet the criteria of a particular application.

The pulse response of the combined channel medium 106 and module 108 is often not known. However, the DFE tap weight Hn may be a good estimate of the pulse response of the combined modules 103, 106, 108 and 110 at time nT. Therefore, equation 16 may be simplified as equation 17 as follows:

$$LMS \text{ gradient} = \text{sign}(EK) \times \text{sign}\left( \sum_{n=N1}^{N2} Hn \times D(K - n - l) \right) \qquad \text{EQ. 17}$$

Here Hn may be the DFE tap weight when the module 110 is not enabled. Thus, the tap weight Hn may be a good estimate of the pulse response of the combined modules 103, 106 and 108 at time nT. While determining the tap weight H(−1) may be possible (the precursor generally serves as the feedback for virtual H(−1) tap), implementation is simpler if N1≥0.

The implementation may be further simplified by normalizing the channel pulse response (e.g., Fn=1). Therefore, equation 11 may be simplified to equation 18 as follows:

$$LMS\ \text{gradient} = \text{sign}(EK) \times \text{sign}\left(\sum_{n=N1}^{N2} D(K-n-l)\right) \quad \text{EQ. 18}$$

Another simplification of the implementation may be to adapt the main cursor based on a variable gain amplifier setting (e.g., within the module 108) rather than using the adaptation technique above, thus eliminating the loop filter.

Consider the following case in which there are a fixed number of FFE taps (e.g., C(−2), C(−1), C0 and C1). For each FFE tap, the tap weight may be generated by the module 124 and sent via the signal comprising the tap weights C1-CM to the module 110 to adjust the corresponding tap weight for the module 110. An initial part of the processing may be to filter input data received in the signal IN with the module 108. The filtered data (e.g., R(t)) may be sent to the loop filter together with the error signals. In some embodiments, the loop filter may be similar to that of common loops to reuse existing designs and to simplify test and maintenance.

The data filter generally emulates the combined filter of the modules 103, 106 and 108. The data filter may be expressed by equation 19 as follows:

$$\text{Filter} = \text{sign}\left(\sum_{n=N1}^{N2} Hn \times D(K-n-l)\right) \quad \text{EQ. 19}$$

Two options may be available. A default option may be to use the DFE tap weights Hn as the channel pulse response Fn, where Hn is obtained when the module 110 is not enabled. The converged DFE tap weights should be frozen after FFE adaptation starts, although the DFE tap weights used by the module 118 may continue to be adapted.

Since each DFE tap weight may have a different step size, normalization is generally done to ensure that the digital code of $H_n$ is proportional to the actual voltage level. The step size of each tap weight and the corresponding normalization formula, which basically converts an original code to the voltage level in integers based on the step size, may be summarized in the following Table 1:

TABLE 1

| DFE Tap Weight | Step Size (mV) | No. of Bits of the Original Code | Normalization Formula | No. of Bits After Normalization |
|---|---|---|---|---|
| H0 | 3 | 6 | (3 × Code) + 60 | 8 |
| H1 | 4 | 5 | 4 × Code | 7 |
| H2 | 4.5 | 5 | sign(Code) × (4 × Code + floor(0.5 × code)) | 8 |
| H3 | 4 | 4 | sign(Code) × 4 × Code | 6 |
| H4 | 4 | 4 | sign(Code) × 4 × Code | 6 |

The tap weight H2 may be the only tap weight that has a fine (e.g., 0.5 millivolt (mV)) precision. To reduce the number of bits that represent the code after normalization, the code for H2 may be rounded up to a largest integer no larger than the code. In Table 1, a maximum number of bits that represent any DFE tap weight code may be 8 (e.g., for tap weight H2). The codes may be used as Hn in equation 13. Therefore, a multi-bit adder (e.g., 8-bit) may be used for each data filter.

Each code is generally based on (a) a code of a corresponding one of the decision feedback equalizer tap weights generated by the module 124, (b) a step size of the corresponding decision feedback equalizer tap and (c) a tap position of the corresponding decision feedback equalizer tap. The original code may be the code of the DFE tap weight used by the receiver adaptation (e.g., module 124).

The other option may be to add up the data bits. The addition may be similar to setting the tap weight Hn to one(1). The values of N1 and N2 may be slightly different between the two options and are summarized in the following Table 2:

TABLE 2

|  | Hn ≠ 1 | Hn = 1 |
|---|---|---|
| N1 | 0 | −1 |
| N2 | 4 | 3 |

Figure 7:
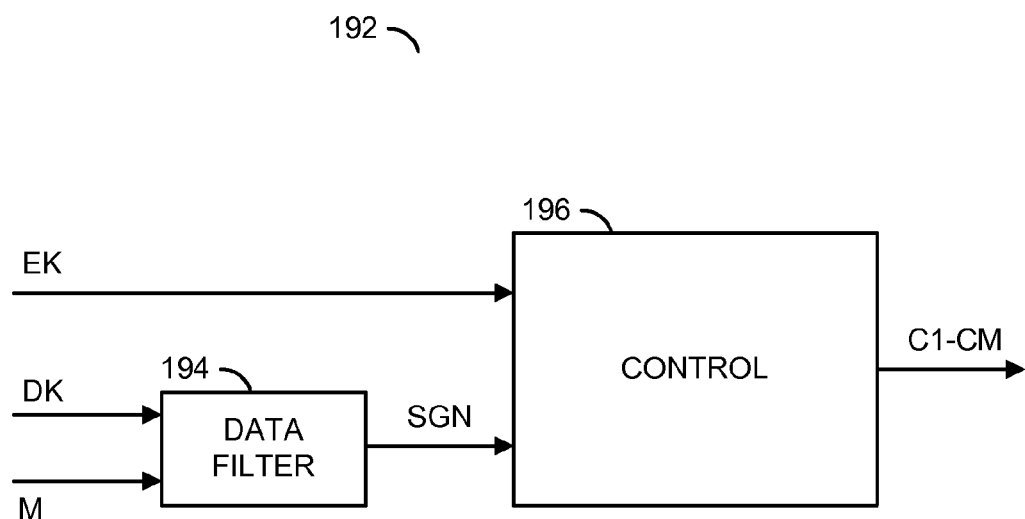
FIG. 7 is a diagram illustrating submodules of a feed forward equalizer adaptation control module of FIG. 6.

Referring to FIG. 7, a block diagram of an example implementation of the module 192 of FIG. 6 is shown. The module 192 generally comprises a block (or circuit) 194 and a block (or circuit) 196. The blocks 194 and 196 may represent modules and/or circuits that may be implemented as hardware, software, a combination of hardware and software, or other implementations. The signals DK and M may be received by the block 194. The signal EK may be received by the block 196. A signal (e.g., SGN) may be generated by the block 194 and presented to the block 196. The signal SGN may convey sign information. The signal comprising the tap weights C1-CM may be generated by the block 196.

The block 194 may implement a data filter circuit. The block 194 is generally operational to calculate sign samples for the recovered data in the signal DK based on the channel estimate (e.g., tap weights) in the signal M. The block 194 generally multiplies sequential recovered data values by corresponding tap weights, sums the resulting products and calculates the sign samples. The block 196 may implement a control circuit. The block 196 is generally operational to control the adaptation of FFE (e.g., the module 110). The adaptation may be based on the error data received in the signal EK from the module 122 and the sign samples received in the signal SGN from the block 194.

Figure 8:
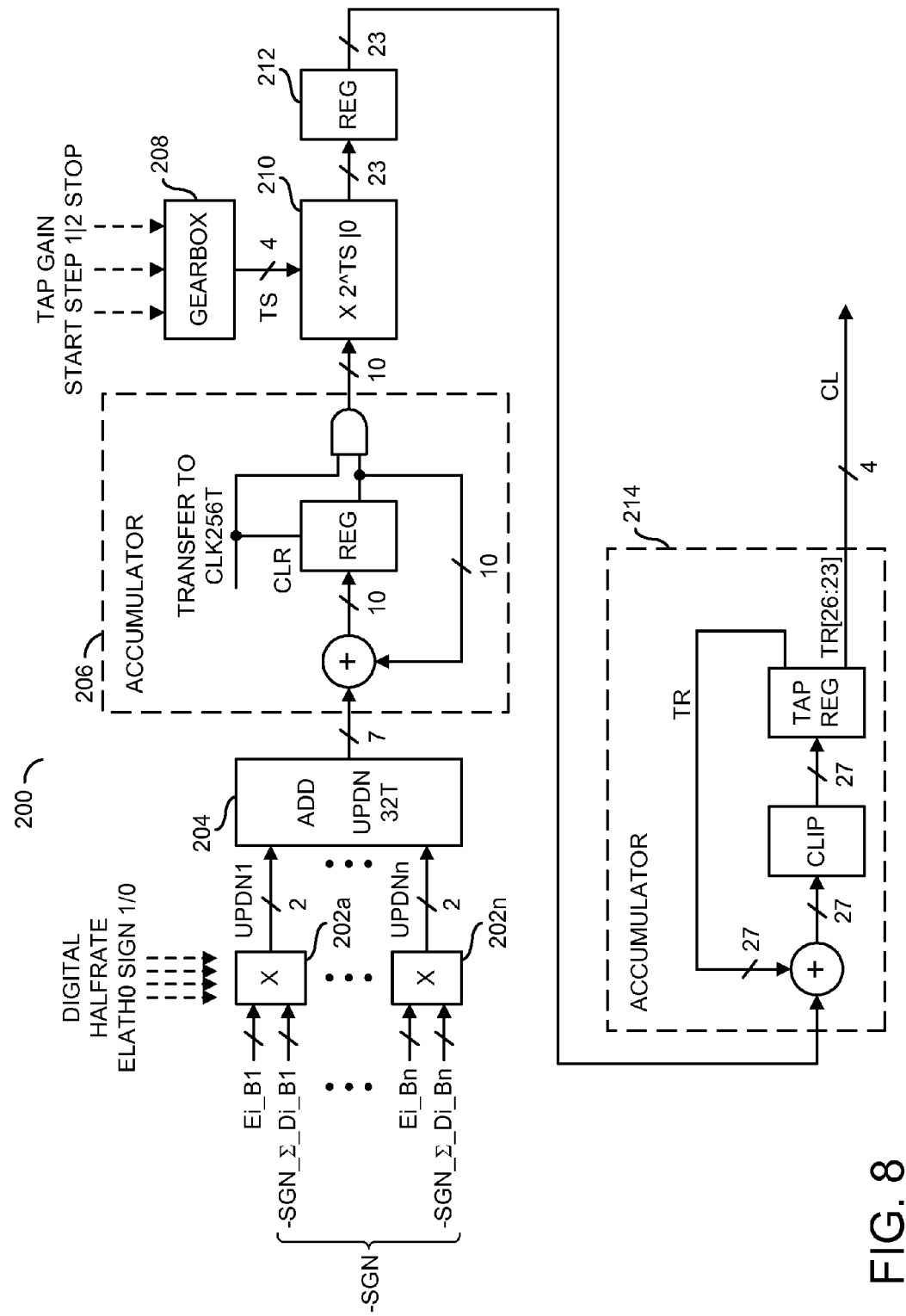
FIG. 8 is a diagram illustrating an example implementation of a control module of FIG. 7.

Referring to FIG. 8, a block diagram of a circuit 200 is shown. The circuit 200 may be used to implement the block 196 of FIG. 7. The circuit 200 generally comprises a number of blocks (or circuits) 202a-202n, a block (or circuit) 204, a block (or circuit) 206, a block (or circuit) 208, a block (or circuit) 210, a block (or circuit) 212, and a block (or circuit) 214. The circuits 202a-214 may represent modules and/or blocks that may be implemented as hardware, software, a combination of hardware and software, or other implementations.

The circuit 200 may initially calculate a gradient of the values received in the signal −SGN. The signal −SGN may comprise multiple components (e.g., −SGN_SIGMA_Di-Bi, . . . , −SGN_SIGMA_Di_Bn). A negative sign (or negative symbol) is generally used before the −SGN_SIGMA_Di_Bi terms, which is different from a typical DFE loop filter. In addition, Di, instead of −SGN_SIGMA_Di_Bi, may be used to check if Ei is valid. In one example, multiple (e.g., 4) loops may be implemented, with multiple (e.g., 32) gradients in each loop, resulting in the computation of many (e.g., 4×32=128) gradients within a 32T period. Because calculating 128 gradients is generally a demanding task, especially if an 8-bit adder is utilized for each gradient, a fewer number of the gradients may be computed instead. For example, only 35 gradients (32 plus 2 precursors and 1 post cursor) out of the 128 gradients may be unique. As a result, each loop may not have 32 dedicated gradient creation blocks. Instead, a correct set of 32 gradients out of the total 35 gradients may be computed and dispatched to every loop, which helps to save an area of the circuitry by approximately 73%.

Each circuit 202a-202n may implement a multiplication circuit. The circuits 202a-202n are generally operational to multiply a number of samples of the error signal EK (e.g., Ei_B1, . . . , Ei_Bn) by corresponding sign samples generated by the circuit 190 (e.g., −SGN_SIGMA_Di_B2, . . . , −SGN_SIGMA_Di_B1). In some embodiments, pairs of the signals Ei_B1 to Ei_Bn and −SGN_SIGMA_Di_B1 to −SGN_SIGMA_Di_Bn may be presented to inputs of the circuits 202a-202n. In general, the inputs to the multipliers 202a-202n may be any bit width. The products of the signal pairs (e.g., UPDN1-UPDNn) may be presented to the circuit 204.

To eliminate a reliance on the data bits that are not yet available, Ei may be shifted earlier by several (e.g., 3) bits for the second precursor loop, with N1 being −1. For consistency, all of the loops generally use the same set of error signals, which include the last three error signals from the previous 32T period, no matter what option is used to filter the data. For each loop, −SGN_SIGMA_Di_Bi may be aligned correctly with the set of error signals.

The circuit 204 may implement an n-bit adder circuit. The circuit 204 is generally operational to sum the signal pairs UPDN1-UPDNn. The signal pairs UPDN1-UPDNn may form a set of n gradients. A 32T latency generally exists between the inputs and the output. An output of the circuit 204 may be presented to the circuit 206.

The circuit 206 may implement an accumulator circuit. The circuit 206 is generally operational to accumulate multiple (e.g., 256) gradients in a 256T period, effectively slowing down the circuits from a 32T cycle to a 256T cycle. Several (e.g., 14) bandwidth settings may be available to shift the output of the multi-bit (e.g., 10-bit) accumulator leftward (e.g., from 0 to 13 bits). The data may be presented to the circuit 210.

The circuit 208 may implement a gearbox circuit. The circuit is generally operational to generate a signal (e.g., TS) that conveys a tap gain. The gearbox shifting generally decreases the tap gain at a constant pace, which helps to speed up the adaptation without sacrificing the performance. The signal TS may be transferred to the circuit 210. The circuit 210 may implement a multiplication circuit. The circuit 210 may multiply the summed value received from the circuit 206 by a value (e.g., $2^{\wedge}TS$). The result may be stored in the circuit 212 (e.g., a register).

The circuit 214 may implement an accumulator circuit. The circuit 214 may be operational to accumulate data received from the circuit 212. The circuit 214 may comprise an adder, a clipping block and a tap register. The data in the tap register may be coded in 2's complement. The top four values in the tap register (e.g., TR[26:23]) may be used as the signal CL. The input to the circuit 214 may comprise a number (e.g., 23) of bits. The accumulation of multiple values generally produces a larger value (e.g., up to 27 bits). The clipping function is generally such that if the sum is more than a predetermined upper value (e.g., $2^{26}-1$), the content of the accumulator may be set to the predetermined upper value. If the sum is less than a predetermined lower value (e.g., $-2^{26}$), the content of the accumulator may be set to approximately the predetermined lower value (e.g., $-(2^{26}-1)$). Since the content of the circuit 214 may be represented in a 2's compliment format, either $-2^{26}$ or $-(2^{26}-1)$ are possible values of the accumulator.

Figure 9:
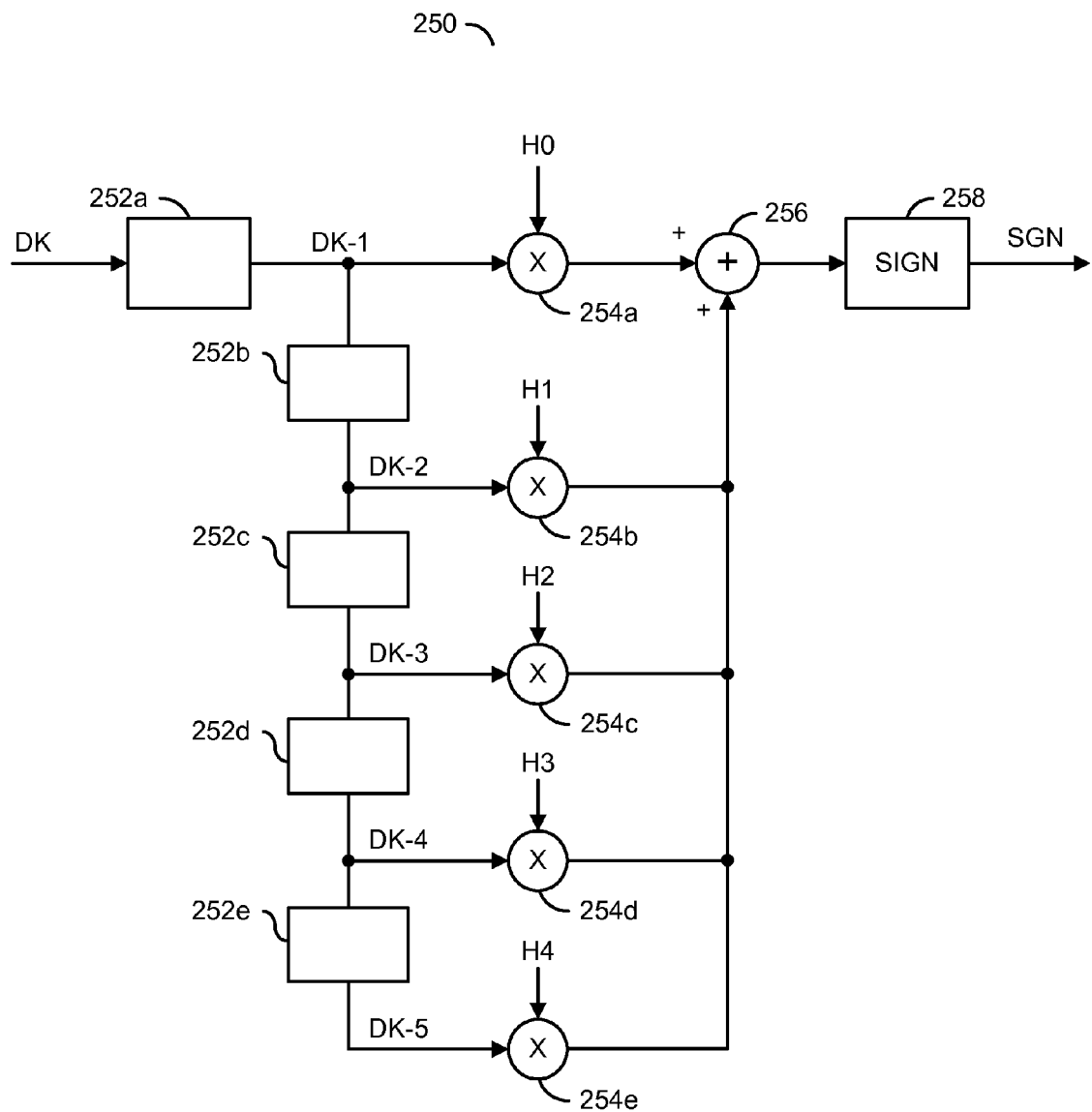
FIG. 9 is a diagram illustrating an example implementation of a data filter of FIG. 7.

Referring to FIG. 9, a block diagram of a circuit 250 is shown illustrating an example implementation of a data filter for tap C1. The circuit 250 may be used to implement the block 192 of FIG. 7. The circuit 250 generally comprises a number of blocks (or circuits) 252a-252e, a number of blocks (or circuits) 254a-254e, a block (or circuit) 256 and a block (or circuit) 258. The circuits 252a-258 may represent modules and/or blocks that may be implemented as hardware, software, a combination of hardware and software, or other implementations. The signal DK may be received by the circuit 252a. The circuit 258 may generate the signal SGN.

Each circuit 252a-252e may implement a register circuit. The circuits 252a-252e may be connected sequentially such that consecutive recovered data values (e.g., 5 consecutive values DK-1 to DK-5) may be shifted from the circuit 252a to the circuit 252e. Each circuit 252a-252e may generate a corresponding output signal (e.g., DK-1 to DK-5) that may be transferred to the circuits 254a-254e.

Each circuit 254a-254e may implement a multiplication circuit. The circuits 254a-254e are generally operational to multiply the recovered data value received from the corresponding circuit 252a-252e by a respective tap weight value (e.g., H0-H4). The tap weight values may be received as components (e.g., H0-H4) of the signal M. Each product calculated by the circuits 254a-254e may be presented to the circuit 256. The circuit 256 may implement an adder circuit. The circuit 256 is generally operational to add (or calculate a sum of) the product values generated by the circuit 254a-254e. A sum value may be presented to the circuit 258. The circuit 258 may implement a sign calculation circuit. The circuit 258 is generally operational to calculate the sign samples for the sum values received from the circuit 256. The sign samples may be presented in the signal SGN.

Figure 10:
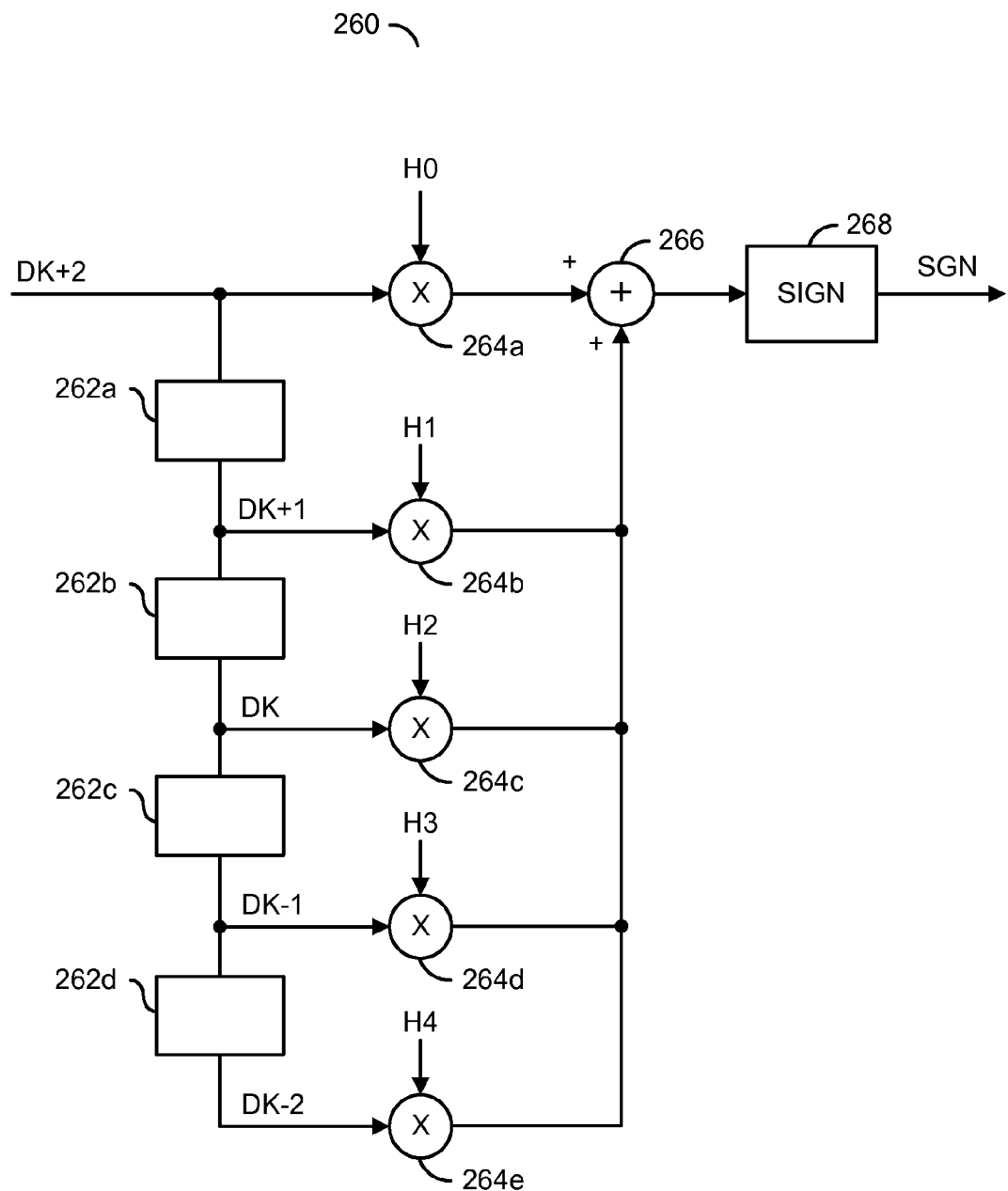
FIG. 10 is a diagram illustrating another example implementation of a data filter of FIG. 7.

Referring to FIG. 10, a block diagram of a circuit 260 is shown illustrating an example implementation of a data filter for tap C(−2). The circuit 260 may be used in an implementation of the block 194 in FIG. 7. The circuit 260 generally comprises a number of blocks (or circuits) 262a-262d, a number of blocks (or circuits) 264a-264e, a block (or circuit) 266 and a block (or circuit) 268. The circuits 262a-262e may represent modules and/or blocks that may be implemented as hardware, software, a combination of hardware and software, or other implementations. The signal. DK+2 may be received by the circuit 262a. The circuit 268 may generate the signal SGN.

Each circuit 262a-262d may implement a register circuit. The circuits 262a-262d may be connected sequentially such that consecutive recovered data values (e.g., five consecutive values DK+1 to DK-1) may be shifted from the circuit 262a to the circuit 262d. The signal DK+2 may be transferred to the circuit 264a. Each circuit 262a-262d may generate a corresponding output (e.g., DK+1 to DK-2) that may be transferred to the circuits 264b-264e.

Each circuit 264a-264e may implement a multiplication circuit. The circuits 264a-264e are generally operational to multiply respective recovered data values by respective tap weights (e.g., H0-H4). The tap weights may be received as components of the signal M. Each product calculated by the circuits 264a-264e may be presented to the circuit 266. The circuit 266 may add the product values and present a sum value to the circuit 268. The circuit 268 may calculate sign samples for the sum values received from the circuit 266. Other embodiments of the block 194 may be implemented accordingly for each tap to meet the criteria of a particular application.

Figure 11:
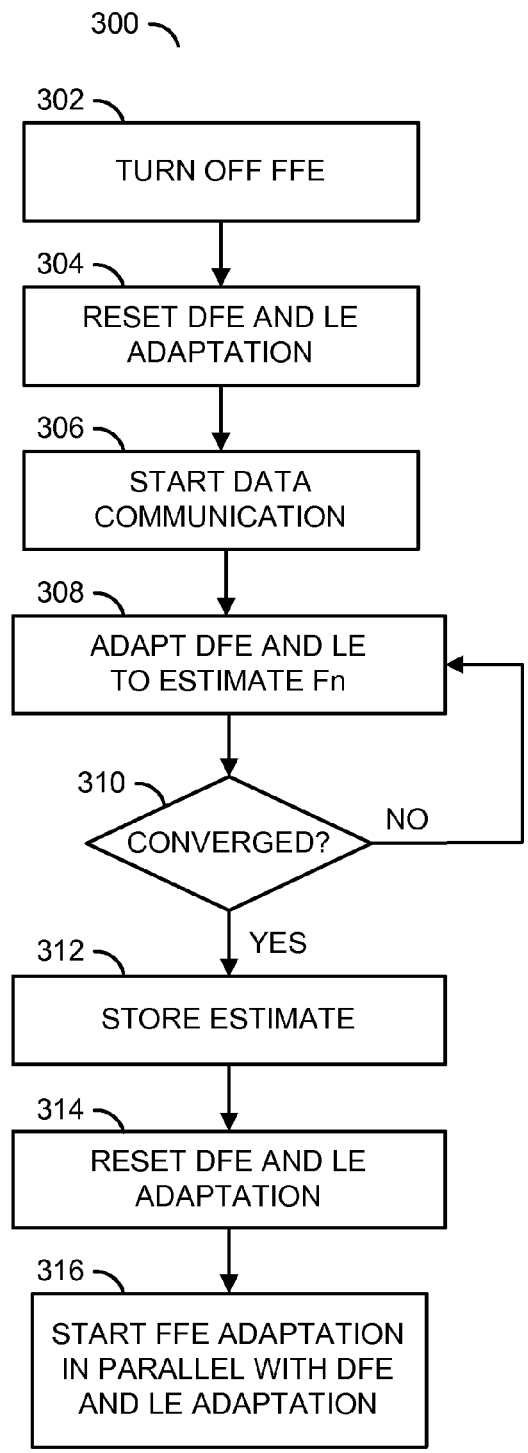
FIG. 11 is a flow diagram illustrating a process in accordance with an embodiment of the present invention.

Referring to FIG. 11, a flow diagram is shown illustrating a process 300 in accordance with an embodiment of the present invention. The process (or method) 300 may include a step 302, a step 304, a step 306, a step 308, a step 310, a step 312, a step 314, and a step 316. The process 300 may start in the step 302. In the step 302, the process 300 may turn off a feed forward equalizer (FFE) and move to the step 304. In the step 304, the process 300 may reset DFE and LE adaptation loops and move to the step 306. In the step 306, the process 300 may start data communication and move to the step 308. In the step 308, the process 300 may allow a decision feedback equalizer (DFE) and linear equalizer (LE) to adapt to obtain an estimate of a transfer function (e.g., pulse response Fn) of the input channel to the DFE. In the step 310, the process 300 may check to determine whether the DFE and LE have converged. The process 300 may loop through the steps 308 and 310 until the tap weights of the DFE have converged. When the tap weights of the DFE have converged, the process 300 may move to the step 312.

In the step 312, the process 300 may store the estimate of Fn represented by the converged tap weight values (e.g., H1-HN) of the DFE. The process 300 may use the stored estimate for adapting the FFE. The tap weight values H1-HN of the DFE obtained this way generally provide an estimate of the pulse response at the DFE input excluding the FFE. The process 300 generally does not update the estimate even though the DFE may continue to be adapted later on. In the step 314, the process 300 resets the decision feedback equalizer and the linear equalizer adaptation loops. In the step 316, the process 300 starts the feed forward equalizer, the decision feedback equalizer, and the linear equalizer adaptation loops in parallel (e.g., at substantially the same time). The decision feedback equalizer and linear equalizer adaptation loops generally use the same bandwidth and are generally allowed to arrive at a joint optimum solution. The process 300 then ends.

A receiver implemented in accordance with an embodiment of the present invention may adapt tap weights of an FFE without having access to digital samples of an input signal of the FFE, adapt the FFE based on an estimation of the pulse response of the input channel, enable joint optimization between the FFE and a DFE, allow the FFE to remove precursor inter-symbol interference (ISI) and/or work together with the DFE to reduce post cursor ISI.

The functions illustrated by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a receiver having a feed forward equalizer (FFE) coupled to a communication channel, said receiver being configured to (i) disable said FFE, (ii) adapt tap weights of a decision feedback equalizer (DFE) while said FFE is disabled, (iii) enable said FFE, and (iv) adapt tap weights of said FFE by utilizing the tap weights of said decision feedback equalizer (DFE), determined while said FFE was disabled, to estimate one or more characteristics of said communication channel.

2. The apparatus according to claim 1, wherein said one or more characteristics of said communication channel comprises a channel pulse response.

3. The apparatus according to claim 1, wherein said estimate comprises a plurality of estimate values calculated based on one or more converged tap weight values of said decision feedback equalizer (DFE).

4. The apparatus according to claim 3, wherein said estimate values comprise a plurality of codes corresponding to a plurality of decision feedback equalizer tap weights.

5. The apparatus according to claim 4, wherein:
said receiver further comprises an adaptation control block configured to adapt said decision feedback equalizer and said feed forward equalizer; and
each of said plurality of codes is based on (i) a code of a corresponding one of said decision feedback equalizer tap weights generated by said adaptation control block, (ii) a step size of a corresponding decision feedback equalizer tap and (iii) a tap position of said corresponding decision feedback equalizer tap.

6. The apparatus according to claim 1, wherein said FFE is adjusted using information generated based on (i) a signal recovered by said receiver from said communication channel, (ii) an error signal, and (iii) said estimate.

7. The apparatus according to claim 6, wherein (i) said receiver is further configured to filter said signal based on said estimate and (ii) said filtering in said receiver varies according to each of a plurality of settings being adapted in said feed forward equalizer.

8. The apparatus according to claim 1, wherein said estimate is generated by (i) disabling said FFE, (ii) adapting a plurality of codes of a plurality of said decision feedback equalizer tap weights in said receiver to said communication channel and (iii) normalizing each of said codes based on a step size and a tap position of a corresponding one of a plurality of decision feedback equalizer taps.

9. The apparatus according to claim 1, wherein said apparatus is implemented as one or more integrated circuits.

10. The apparatus according to claim 1, further comprising a linear equalizer (LE) coupling said FFE to said communication channel, wherein said estimate further accounts for an effect of said LE on said one or more characteristics of said communication channel.

11. The apparatus according to claim 10, further comprising an adaptation control logic configured to adapt said tap weights of said FFE by (i) switching said FFE off, (ii) starting adaptation of said decision feedback equalizer (DFE) and allowing tap weights of said DFE to converge, (iii) utilizing the tap weights of said DFE to estimate a channel pulse response, (iv) switching said FFE on, and (v) starting adaptation of said FFE, said DFE, and said LE.

12. A method of feed forward equalizer adaptation, comprising the steps of:
(A) filtering a signal received in a receiver using a feed forward equalizer (FFE) coupled to a communication channel; and
(B) adjusting said filtering by (i) disabling said FFE, (ii) adapting tap weights of a decision feedback equalizer (DFE) while said FFE is disabled, (iii) enabling said FFE, and (iv) adapting tap weights of said FFE using the tap weights of said decision feedback equalizer (DFE), determined while said FFE was disabled, to estimate one or more characteristics of said communication channel.

13. The method according to claim 12, wherein said one or more characteristics comprise a channel pulse response.

14. The method according to claim 12, wherein said estimate comprises a plurality of estimate values calculated based on one or more converged tap weight values of said decision feedback equalizer (DFE).

15. The method according to claim 14, wherein said plurality of estimate values comprises a plurality of codes corresponding to a plurality of said decision feedback equalizer tap weights.

16. The method according to claim 15, further comprising the step of:
adapting said decision feedback equalizer tap weight values, wherein each of said codes is based on (i) a code of a corresponding one of said decision feedback equalizer tap weights, (ii) a step size of a corresponding decision feedback equalizer tap and (iii) a tap position of said corresponding decision feedback equalizer tap.

17. The method according to claim 12, further comprising the step of:
generating information to further adjust said FFE and said DFE based on (i) a signal recovered by said receiver from said communication channel, (ii) an error signal and (iii) said estimate.

18. The method according to claim 12, further comprising the steps of:
disabling said FFE in said receiver;
adapting a plurality of codes of a plurality of said decision feedback equalizer tap weights in said receiver to said communication channel; and
normalizing each of said codes based on a step size and a tap position of a corresponding one of a plurality of decision feedback equalizer taps.

19. The method according to claim 12, further comprising the steps of:
defining a set of adaptation gradients for adapting tap weight coefficients of said FFE;
identifying a set of unique gradients from among the set of defined adaptation gradients; and
computing values for the set of unique gradients and sharing the computed values for set of unique gradients between adaptation loops of said FFE.

20. An apparatus comprising:
means for receiving having a feed forward equalizer coupled to a communication channel; and
means for adjusting said feed forward equalizer, said adjusting means configured to adapt tap weights of said feed forward equalizer by (i) switching said feed forward equalizer off, (ii) starting adaptation of a decision feedback equalizer and allowing tap weights of said decision feedback equalizer to converge, (iii) utilizing the tap weights of said decision feedback equalizer to estimate one or more characteristics of said communication channel, (iv) switching said feed forward equalizer on, and (v) starting adaptation of said feed forward equalizer and said decision feedback equalizer.

* * * * *